(12) United States Patent
Glavas

(10) Patent No.: US 12,337,743 B2
(45) Date of Patent: Jun. 24, 2025

(54) AIR RESERVOIR INTEGRATED INTO SEAT BACK CARRIER PLATE

(71) Applicant: GM Global Technology Operations LLC, Detroit, MI (US)

(72) Inventor: Athanasios Glavas, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 265 days.

(21) Appl. No.: 18/308,183

(22) Filed: Apr. 27, 2023

(65) Prior Publication Data

US 2024/0359609 A1 Oct. 31, 2024

(51) Int. Cl.
   *B60N 2/90*  (2018.01)
   *A47C 7/46*  (2006.01)
   *B60N 2/66*  (2006.01)
   *B60N 2/70*  (2006.01)

(52) U.S. Cl.
   CPC .............. *B60N 2/914* (2018.02); *A47C 7/467* (2013.01); *B60N 2/665* (2015.04); *B60N 2/7082* (2013.01)

(58) Field of Classification Search
   CPC ...... B60N 2/914; B60N 2/665; B60N 2/7082; B60N 2/976; A47C 1/0244; A47C 1/03216; A47C 7/142; A47C 7/446; A47C 7/467

See application file for complete search history.

(56) References Cited

U.S. PATENT DOCUMENTS

| | | | | |
|---|---|---|---|---|
| 5,558,398 A | * | 9/1996 | Santos | A47C 7/46 297/284.6 |
| 10,434,918 B2 | * | 10/2019 | Raines | B60N 2/206 |
| 2024/0325938 A1 | * | 10/2024 | Migliacci | B60N 2/914 |
| 2024/0369122 A1 | * | 11/2024 | Löhken | F16F 9/3214 |

\* cited by examiner

*Primary Examiner* — Syed A Islam
(74) *Attorney, Agent, or Firm* — CANTOR COLBURN LLP

(57) ABSTRACT

A vehicle and seat for the vehicle that provides a cushion. The seat includes a seat back forming an open volume, a carrier plate disposed on the seat back within the open volume, an air bladder, an air reservoir disposed on the carrier plate for inflating the air bladder, wherein the air reservoir is disposed on the carrier plate within the open volume of the seat back and is configured to control an air pressure within the air bladder. A pump is disposed within the open volume and is configured to control a flow of ambient air into the air reservoir.

20 Claims, 8 Drawing Sheets

US 12,337,743 B2

AIR RESERVOIR INTEGRATED INTO SEAT BACK CARRIER PLATE

INTRODUCTION

The subject disclosure relates to seat for passengers in vehicles and, in particular, to an air reservoir for controlling a pressure in an air bladder of a seat.

Seats used in vehicles include air bladders that can be inflated or deflated to control a comfort level for a passenger sitting in the seat. A pump and an air module are used to control the pressure in the air bladders. The air module includes valves for controlling flow of air between the pump and the air module. The pump tends to make an undesirable noise when activated. Accordingly, it is desirable to provide a device for inflating or deflating the air bladders without directly using the pump.

SUMMARY

In one exemplary embodiment, a method for providing a cushion at a seat of a vehicle is disclosed. The method includes disposing a carrier plate within an open volume of a seat back, disposing an air bladder on the seat back, placing an air reservoir on the carrier plate, wherein the air reservoir is disposed on the carrier plate within the open volume of the seat back, operating the air reservoir to control an air pressure within the air bladder, and controlling a pump to control flow of ambient air into the air reservoir, wherein the pump is disposed within the open volume.

In addition to one or more of the features described herein, the method further includes storing the air reservoir on the carrier plate via a bracket of the carrier plate. The air reservoir is an integrated component of the carrier plate. The method further includes welding a front plate and a rear plate to form the carrier plate. The method further includes welding a front plate to a center plate of the carrier plate and welding a rear plate to the center plate. The method further includes filling the air bladder via the air reservoir until the air pressure within the air reservoir is equal to the air pressure within the air bladder and then controlling the pump to replenish the air reservoir. The method further includes operating an air module to control the flow of air between the air reservoir and the air bladder.

In another exemplary embodiment, a seat for a vehicle is disclosed. The seat includes a seat back forming an open volume, a carrier plate disposed on the seat back within the open volume, an air bladder, an air reservoir disposed on the carrier plate for inflating the air bladder, wherein the air reservoir is disposed on the carrier plate within the open volume of the seat back and is configured to control an air pressure within the air bladder, and a pump configured to control a flow of ambient air into the air reservoir, wherein the pump is disposed within the open volume.

In addition to one or more of the features described herein, the carrier plate includes a bracket and the air reservoir includes an air tank stored on the carrier plate via the bracket. The air reservoir is an integrated component of the carrier plate. The air reservoir is created by a weld between a front plate and a rear plate, wherein the front plate and the rear plate form the carrier plate. The seat air reservoir is created by a first weld between a front plate and a center plate of the carrier plate and a second weld between a rear plate and the center plate. The seat further includes a primary pump disposed in the open volume and a secondary pump disposed in the open volume. The seat further includes an air module integrated into the carrier plate, wherein the air module is configured to control a flow of air between the air reservoir and the air bladder.

In yet another exemplary embodiment, a vehicle is disclosed. The vehicle includes a seat for a passenger of the vehicle. The seat includes a seat back forming an open volume, a carrier plate disposed on the seat back within the open volume, an air bladder, an air reservoir disposed on the carrier plate for inflating the air bladder, wherein the air reservoir is disposed on the carrier plate within the open volume of the seat back and is configured to control an air pressure within the air bladder, and a pump configured to control a flow of ambient air into the air reservoir, wherein the pump is disposed within the open volume.

In addition to one or more of the features described herein, the carrier plate includes a bracket and the air reservoir includes an air tank stored on the carrier plate via the bracket. The air reservoir is an integrated component of the carrier plate. In one embodiment, the air reservoir is created by a weld between a front plate and a rear plate. In another embodiment, the weld includes a first weld between the front plate and a center plate of the carrier plate and a second weld between the rear plate and the center plate. The vehicle further includes a primary pump disposed in the open volume and a secondary pump disposed in the open volume. The vehicle further includes an air module integrated into the carrier plate, wherein the air module is configured to control a flow of air between the air reservoir and the air bladder.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
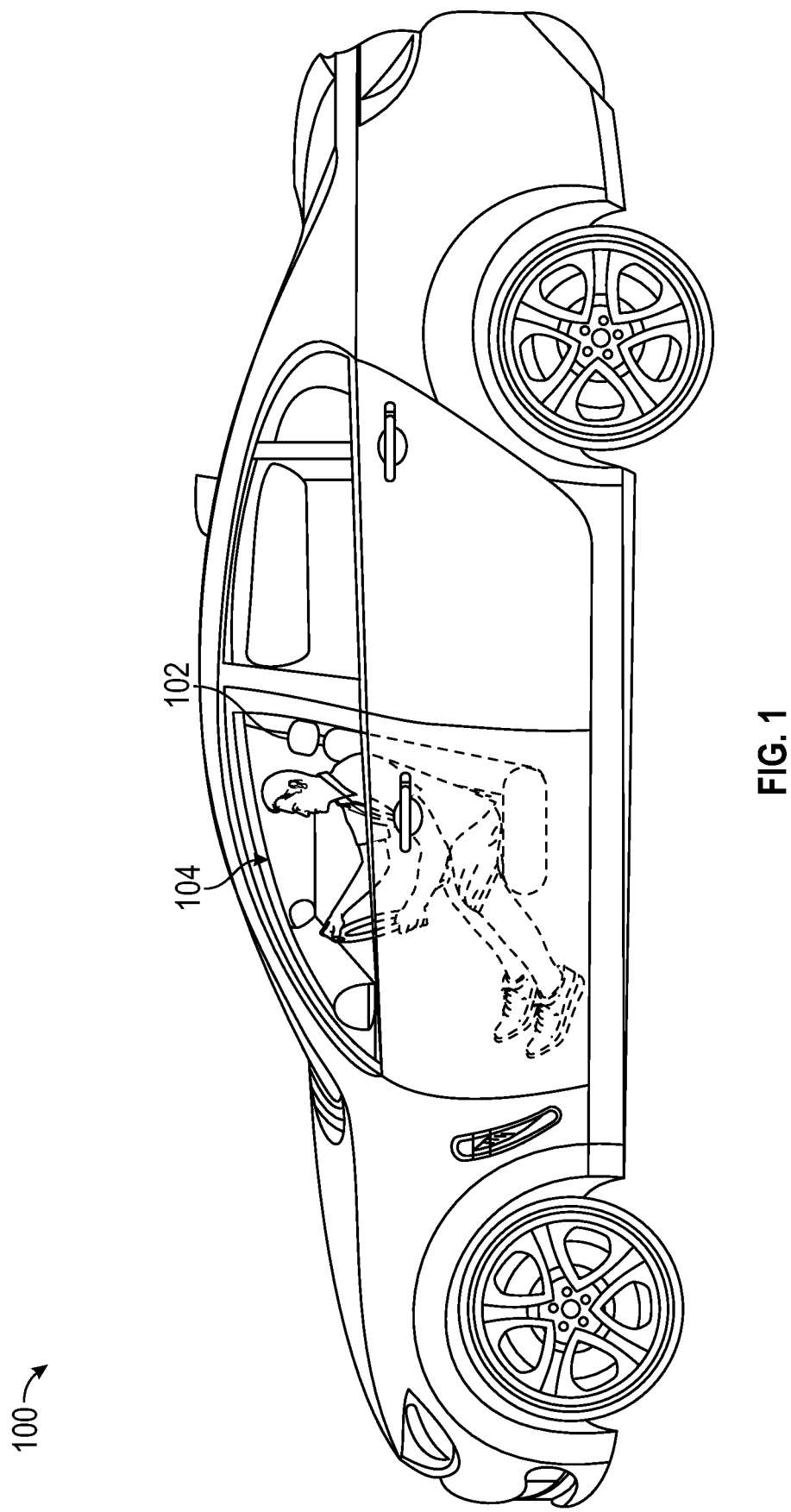
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a vehicle 100 is shown in FIG. 1. The vehicle includes a seat 102 in which a person 104 sits.

Figure 2:
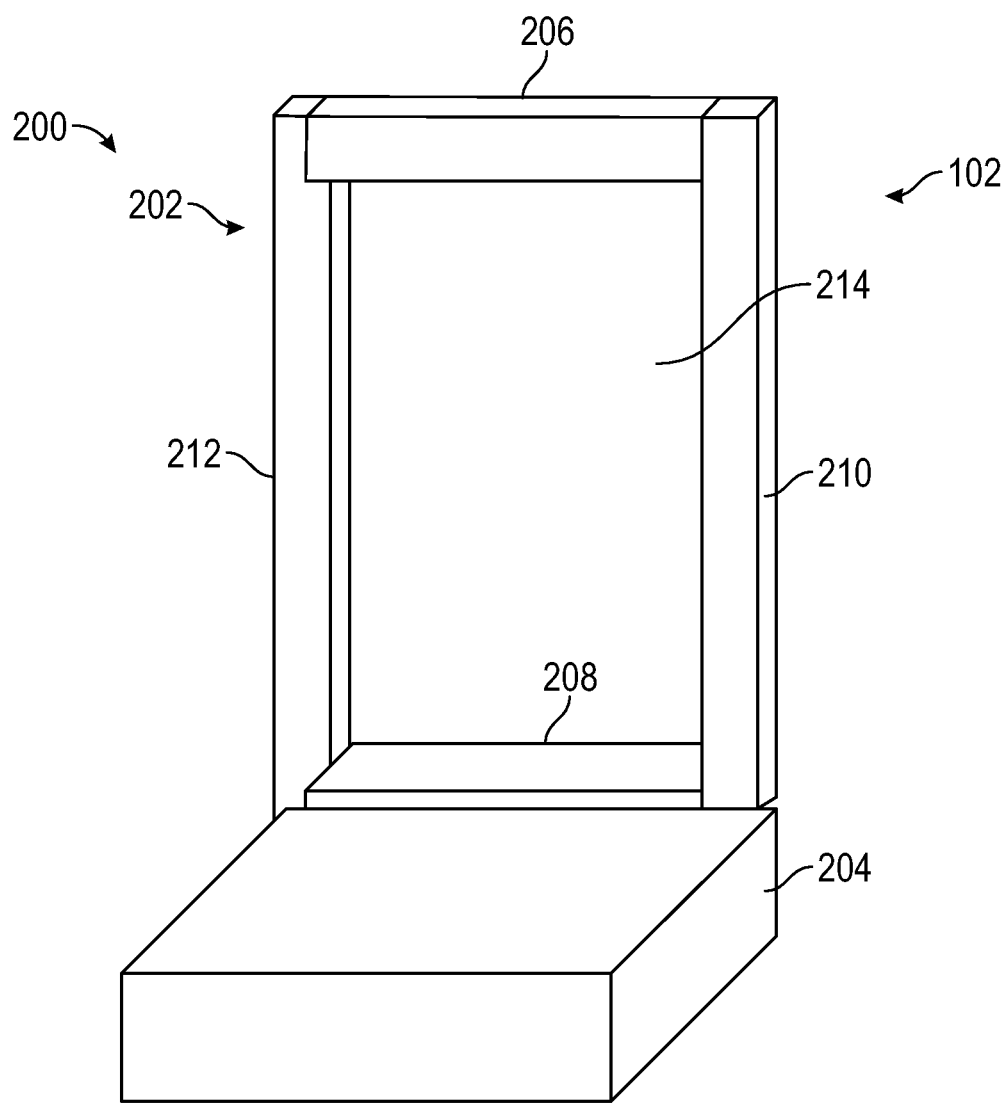
FIG. 2 shows a schematic of a frame of a seat of the vehicle, in an illustrative embodiment.

FIG. 2 shows a schematic of a frame 200 of the seat 102 of the vehicle 100, in an illustrative embodiment. The frame 200 includes a seat back 202 and a seat cushion 204. The seat back 202 includes an upper beam 206, a lower beam 208, a left post 210 and a right post 212, which define an open volume 214 therebetween. Various elements can be placed within the open volume 214 in order to provide back support to the person 104 sitting in the seat 102.

Figure 3:
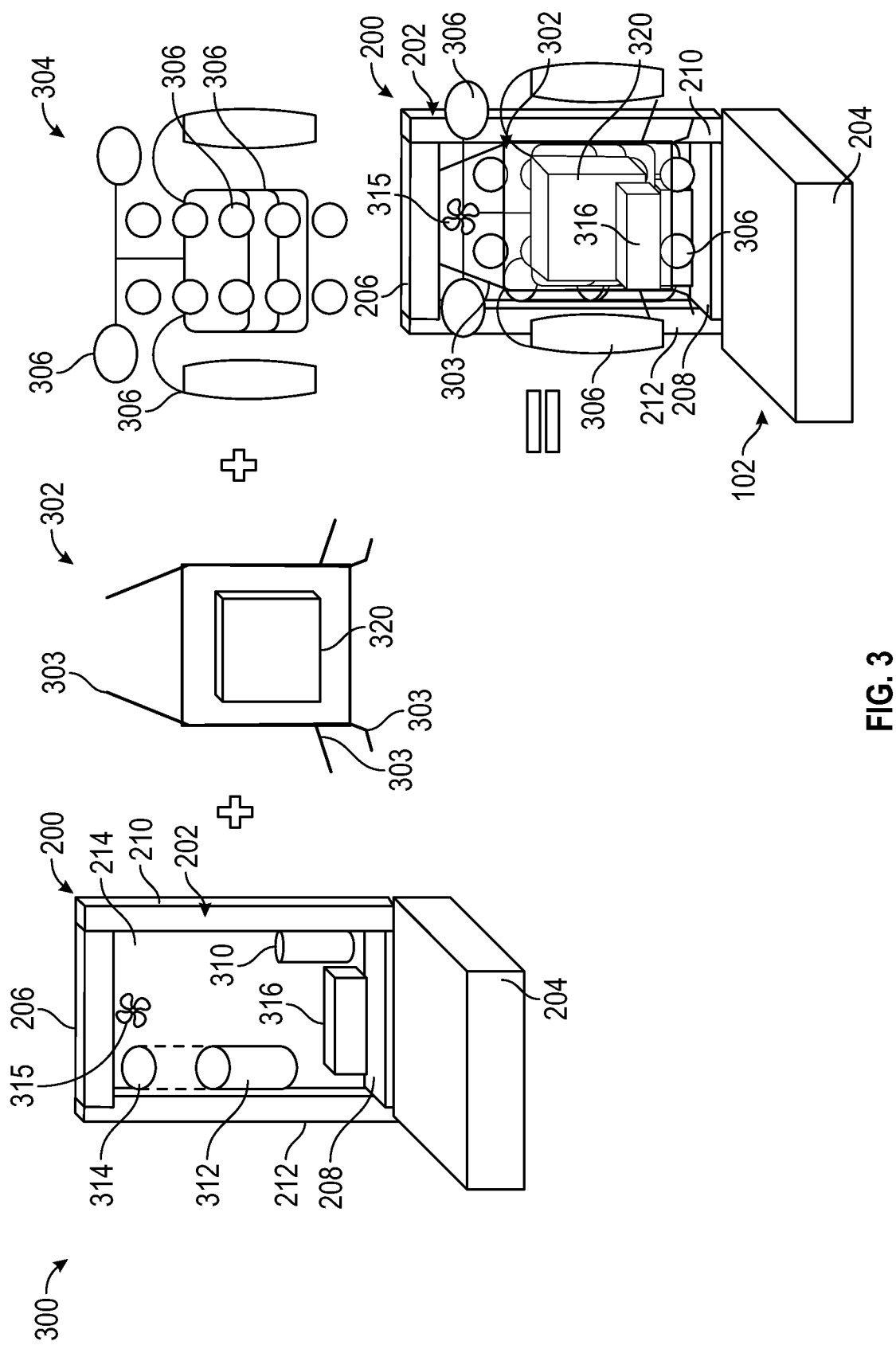
FIG. 3 shows a schematic diagram illustrating assembly of the seat, in an exemplary embodiment.

FIG. 3 shows a schematic diagram 300 illustrating assembly of the seat 102, in an exemplary embodiment. The assembly is shown in separate parts including the frame 200, a carrier plate 302 and an air bladder assembly 304. The seat back 202 is shown to includes devices for operating the seat 102. A motor 310 is disposed within the open volume 214. The motor 310 is configure for reclining the seat back 202 with respect to the seat cushion 204. A blower fan 315 is shown disposed within the open volume of 214. Various other devices that are part of a passenger support assembly are disposed within the open volume 214. The devices include a primary pump 312, a secondary pump 314, and an air module 316. The air module 316 includes air conduits (not shown), valves and controllers for controlling operation of the valves to direct air into the air bladder assembly 304. The primary pump 312, secondary pump 314 and air module 316 are disposed within the open volume 214, without extending outside of a seat trim outline of the seat 102. The primary pump 312 and secondary pump 314 can be affixed to the seat back 202, such as at the right post 212. The air module 316 can be affixed to the seat back 202. Alternatively, the air module 316 is an integrated component of the carrier plate 302. Although a single air module 316 is shown, in various embodiments, the air module 316 can include two or more air modules.

The carrier plate 302 includes an air reservoir 320. The air reservoir 320 can be secured to the carrier plate 302 through various connective members or an integrated feature of the carrier plate 302. The air reservoir 320 is secured to the carrier plate 302 and is contained within the open volume 214 or at least within the seat trim outline of the seat back 202. The carrier plate 302 includes connecting elements 303 that are used to connect to the seat back 202. The connecting elements 303 can be wires or connecting rods, in various embodiments.

The air bladder assembly 304 includes one or more air bladders 306 that can be inflated or deflated to provide a cushioned support for the person in the seat 102. The conduits of the air module 316 are connected to the one or more air bladders 306. Centrally located air bladders 306 can be sandwiched between the carrier plate 302 and the person sitting in the seat 102. The primary pump 312, secondary pump 314, air reservoir 320, air module 316 and air bladder assembly 304 make up a passenger support assembly.

Figure 4:
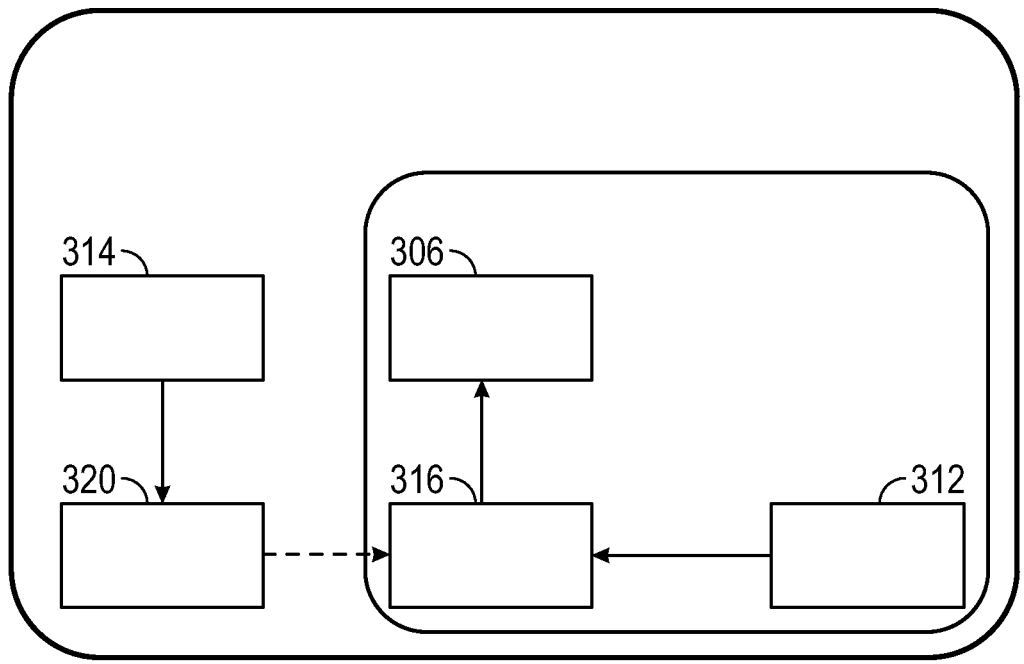
FIG. 4 shows a block diagram depicting operation of the passenger support assembly, in a first mode of operation.

FIG. 4 shows a block diagram 400 depicting operation of the passenger support assembly, in a first mode of operation. The primary pump 312, air module 316 and one or more bladders 306 form a basic system of the passenger support assembly. The primary pump 312 is used to pump air via the air module 316 into the one or more bladders 306. This handles the standard operation of the air bladder assembly. The primary pump 312 can be activated automatically or in response to an instruction from the person 104 in the seat 102.

The secondary pump 314 and air reservoir 320 are used as auxiliary components of the passenger support assembly. The air reservoir 320 can be a pressurized reservoir that can be controlled to release air into the one or more bladders 306. In an embodiment, the air reservoir 320 can be used simultaneously with the primary pump 312 to pressurize the air bladder. In particular, when additional airflow is needed, the air module 316 can block off airflow from the primary pump 312 and open an air inlet from the air reservoir 320 to travel to the one or more bladders 306.

The one or more bladders 306 can be depressurized or deflated by releasing air therein to the air reservoir 320 via the air module 316. The secondary pump 314 can be used to pressurize the air reservoir 320 by controlling a flow of ambient air into the air reservoir. In an embodiment, the secondary pump 314 can fill the air reservoir to about 600 millibar pressure, whereas the air bladders can have about 300 millibar pressure. The secondary pump 314 does not need to be used along with the primary pump 312 when pressurizing the one or more bladders 306. Instead, the secondary pump 314 can pressurize the air reservoir 320 during a first time period during which the air reservoir 320 is not being used to inflate or deflate the one or more air bladders 306. In particular, the secondary pump 314 can be activated during a second time period when the noise of the secondary pump 314 is not noticed. For example, the first time period can be a time at which the vehicle 100 is at rest and is therefore quiet. The second time period can be a time which the vehicle 100 is moving or is making noise which can overwhelm the noise from the secondary pump 314.

Figure 5:
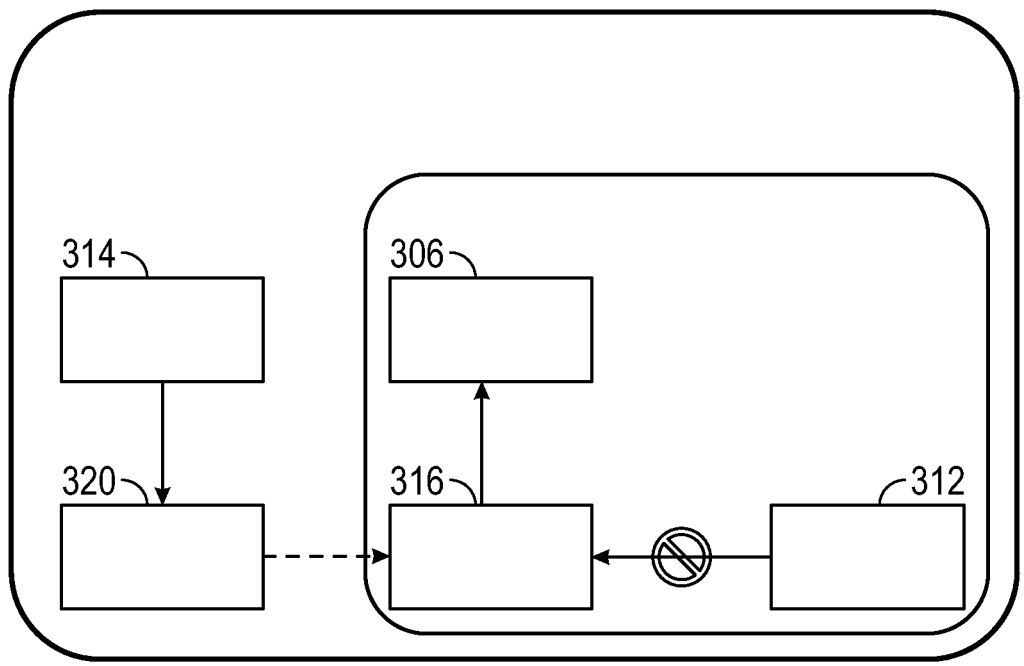
FIG. 5 shows a block diagram depicting operation of the seat cushion assembly, in a second mode of operation.

FIG. 5 shows a block diagram 500 depicting operation of the seat cushion assembly, in a second mode of operation. In the second mode, the primary pump 312 is disconnected from the air module or is turned off. The inflation of the bladders is performed using only the air reservoir 320 and the secondary pump 314. As discussed herein, the air reservoir 320 is pressurized and can be used to inflate the one or more air bladders 306 by selectively opening and/or closing valves in the air module 316. Operation of the air reservoir works off Boyle's law to transfer flow of air from an area of high air pressure to an area of low air pressure.

In an embodiment, the passenger requests inflation of the one or more bladders 306 while vehicle is in quiet mode (i.e., an off position or a stationary position). The pump does not get activated. The air module 316 closes off the primary pump 312 and opens a passage for air to flow from the air reservoir 320 to the one or more air bladders 306 which inflate to a desired air pressure. In an embodiment, the air reservoir 320 can be used exclusively to inflate and fill the one or more air bladders 306 multiple times until the air pressure within the air reservoir 320 is equal to the air pressure within the one or more air bladders 306. Once pressure equilibrium is reached, the secondary pump 314 can be used to replenish the air reservoir 320 (i.e., increase the air pressure in the air reservoir) so that the air reservoir can again be used to fill the one or more air bladders 306.

Figure 6:
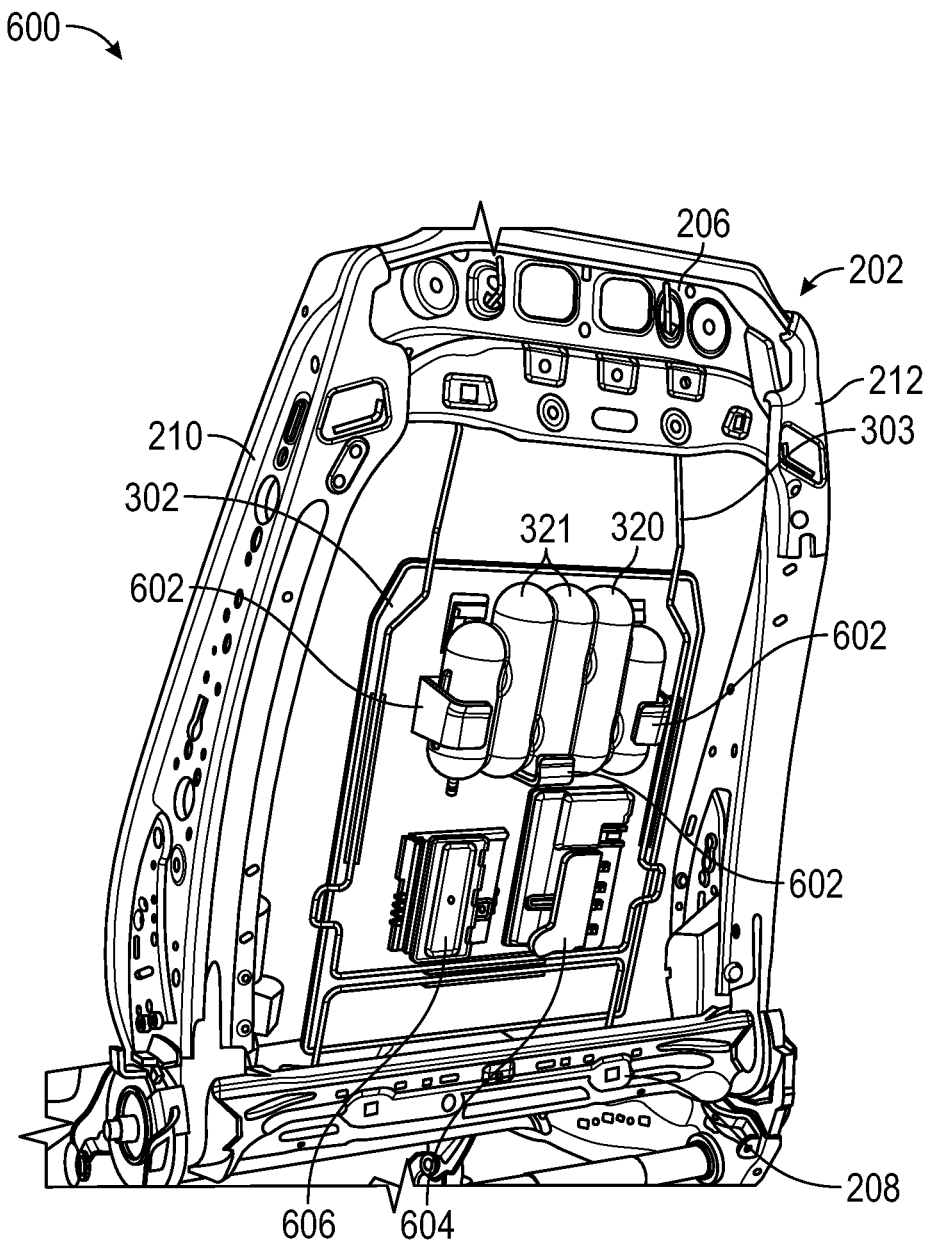
FIG. 6 shows a perspective view of the seat back, in an illustrative embodiment.

FIG. 6 shows a perspective view 600 of the seat back 202, in an illustrative embodiment. The carrier plate 302 is shown including brackets 602. The air reservoir 320 includes air tanks 321 that are separable from the carrier plate 302. To install the air reservoir 320, the air tanks 321 can be dropped into the brackets 602, which hold the air tanks in place at a back side of the carrier plate 302. As shown in FIG. 6, the carrier plate 302 includes a first air module 604 and a second air module 606 integrated therein.

Figure 7:
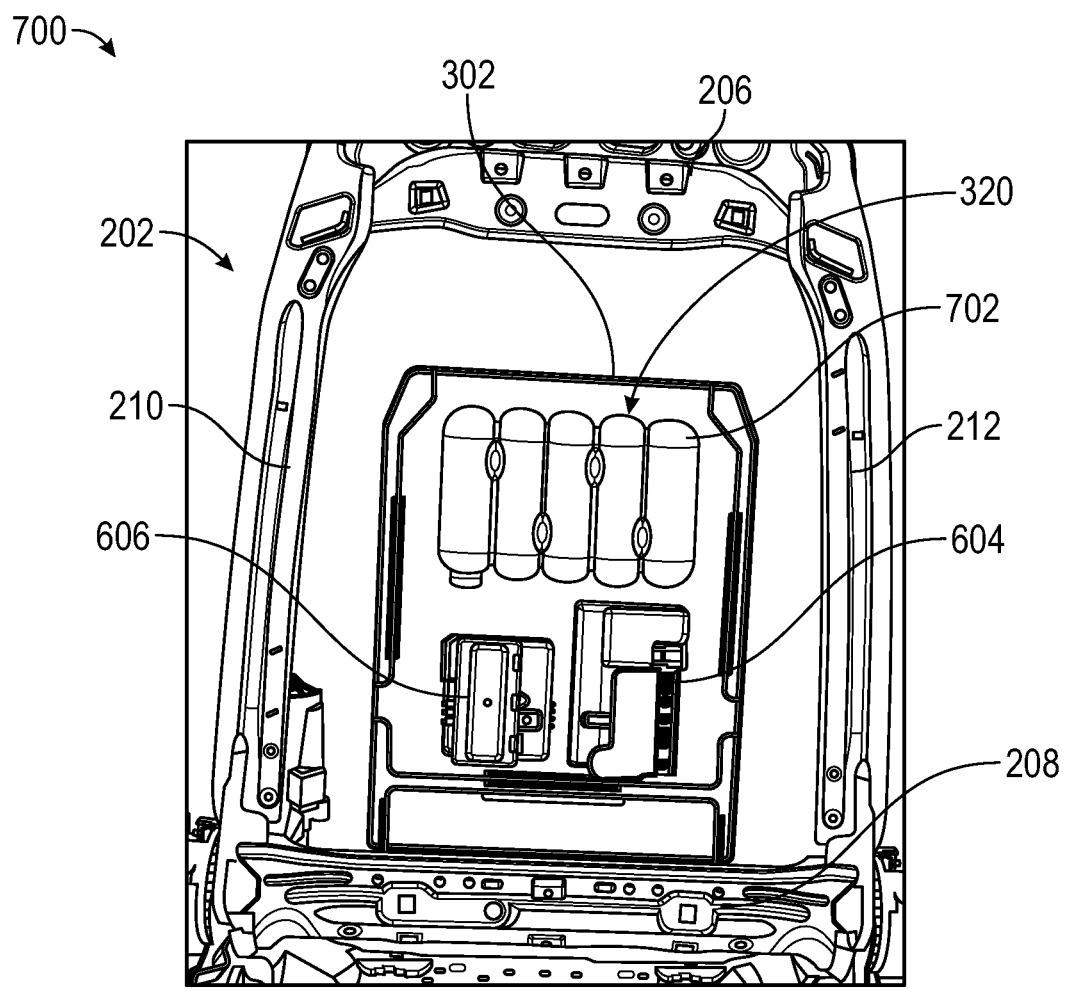
FIG. 7 shows a perspective view of the seat back including an integrated air reservoir, in an embodiment.

FIG. 7 shows a perspective view 700 of the seat back 202 including an integrated air reservoir 320, in an embodiment.

Carrier plate 302 includes a rear plate (shown) and a front plate (not shown) that fit together to form the carrier plate. The rear plate includes a rear half shell 702 that extends out of the plane of the rear plate towards the rear of the seat. The front plate includes a front half shell that extends out of the plane of the front plate towards the front of the seat. By attaching the front plate to the rear plate, the front half shell and the rear half shell 702 form a volume for air to make the air reservoir 320 (FIG. 3).

Figure 9:
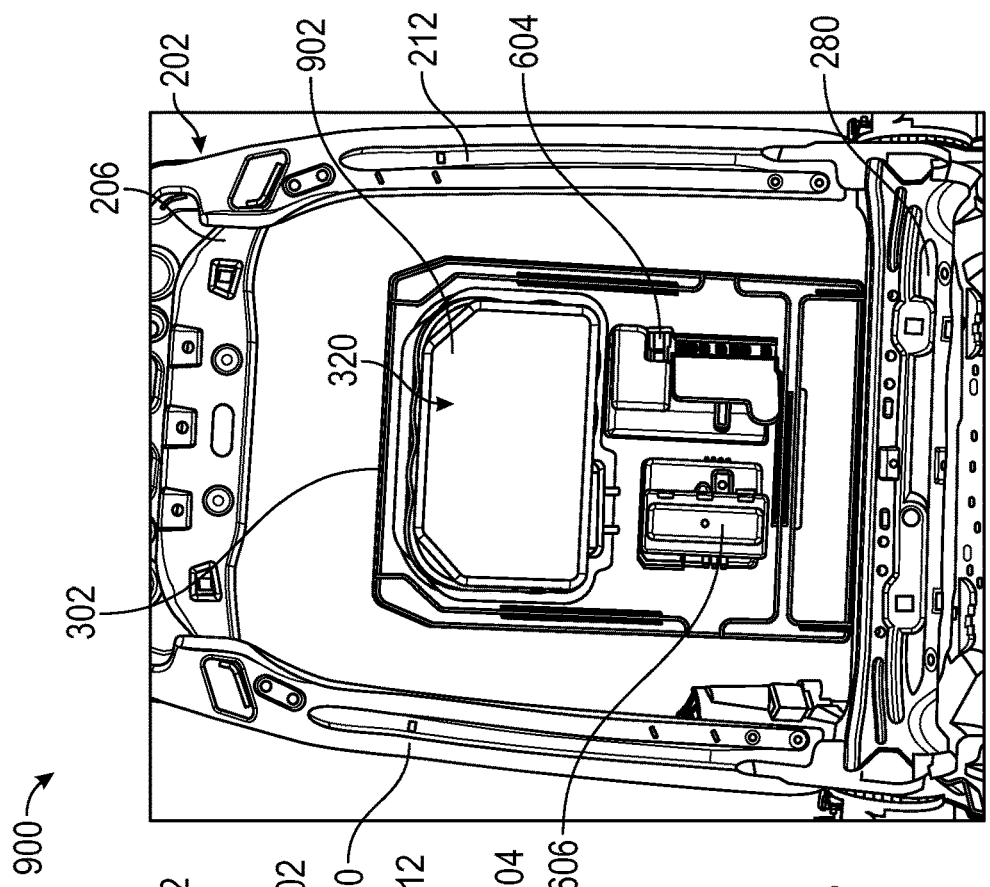
FIG. 9 shows a perspective view of the seat back including an integrated air reservoir, in another embodiment.
Figure 8:
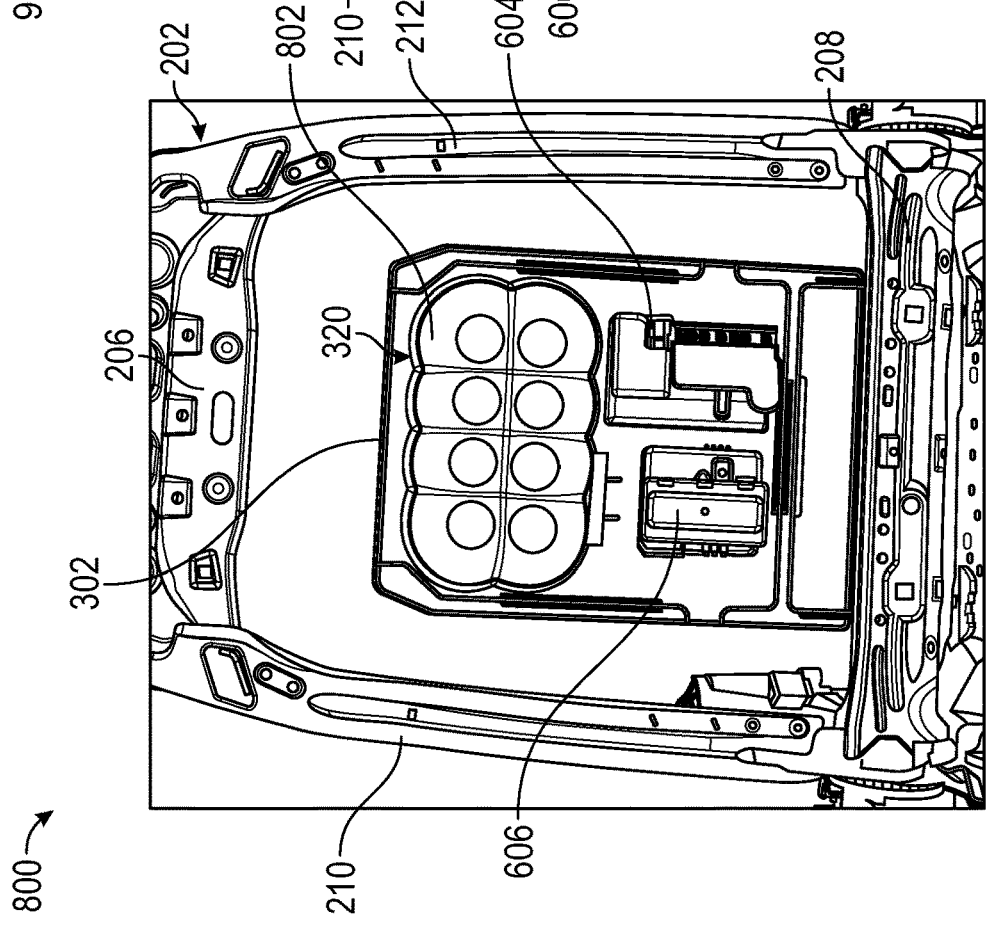
FIG. 8 shows a perspective view of the seat back including an integrated air reservoir, in another embodiment.

FIG. 8 shows a perspective view 800 of the seat back 202 including an integrated air reservoir 320, in another embodiment. The rear plate of the carrier plate 302 includes a half shell in an egg crate formation 802. FIG. 9 shows a perspective view 900 of the seat back 202 including an integrated air reservoir 320, in another embodiment. The rear plate of the carrier plate 302 includes a half-shell in a flat plate formation 902.

Figure 10:
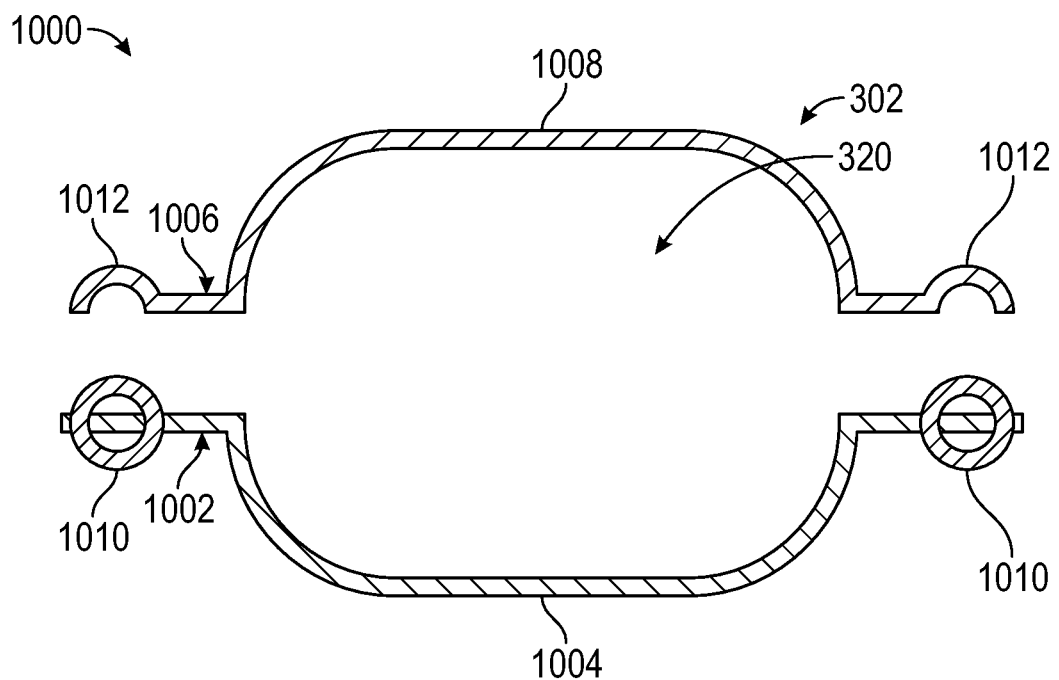
FIG. 10 shows a top sectional view of the carrier plate having an integrated air reservoir.

FIG. 10 shows a top sectional view 1000 of the carrier plate 302 having an integrated air reservoir 320. The rear plate 1002 is shown with a rear half shell 1004. The front plate 1006 is shown in a front half shell 1008. The rear plate 1002 includes a first mating section 1010 and the front plate 1006 includes a second mating section 1012 that is complimentary to the first mating section 1010. The second mating section 1012 is welded to the first mating section 1010 to connect front plate 1006 to the rear plate 1002, thereby causing the rear half shell 1004 and the front half shell 1008 to form a sealed area for the air reservoir 320.

Figure 11:
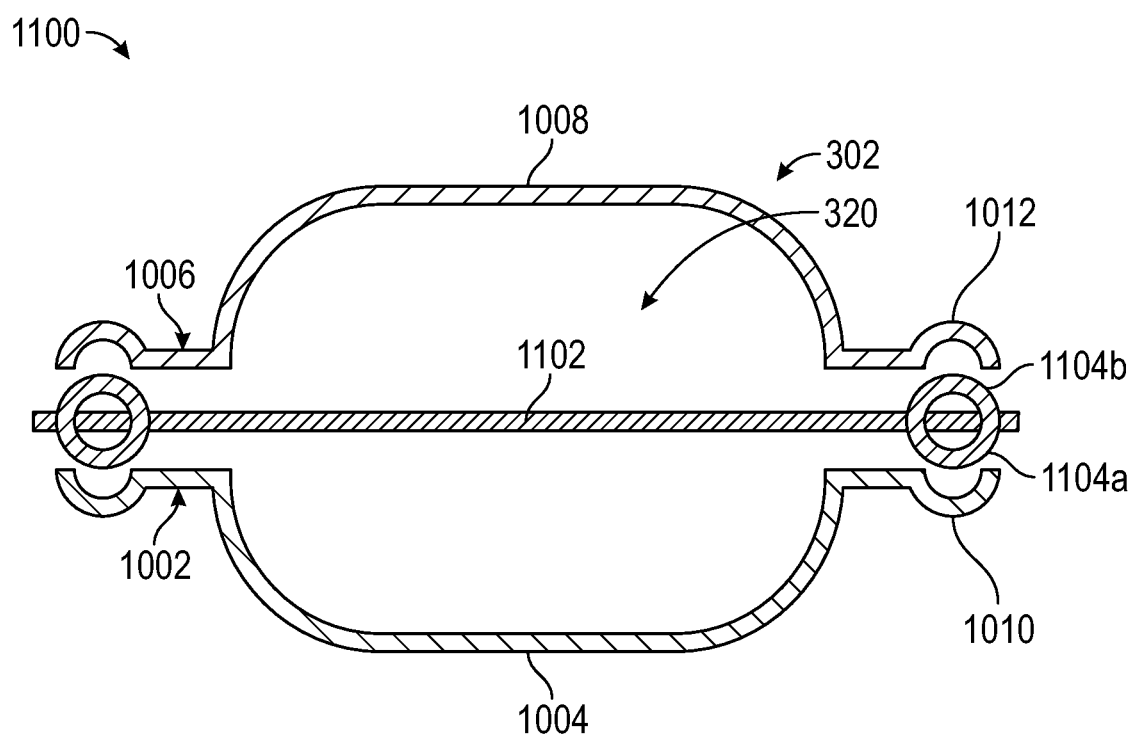
FIG. 11 shows a top sectional view of the carrier plate having an integrated air reservoir.

FIG. 11 shows a top sectional view 1100 of the carrier plate 302 having an integrated air reservoir 320. The rear plate 1002 is shown with a rear half shell 1004. The front plate 1006 is shown in a front half shell 1008. The rear plate 1002 and the front plate 1006 are coupled, respectively, to rear and front sides of a center plate 1102 of the carrier plate 302. The center plate 1102 includes a central rear mating section 1104a and a central front mating section 1104b. The rear plate 1002 includes the first mating section 1010 that is complementary to the central rear mating section 1104a. The front plate 1006 includes the second mating section 1012 that is complementary to the central front mating section 1104b. The first mating section 1010 is welded to the central rear mating section 1104a to connect rear plate 1002 to the center plate 1102. The second mating section 1012 is welded to the central front mating section 1104b to connect the front plate 1006 to the center plate 1102. The center plate 1102 can have perforations that are encapsulated by the rear half shell 1004 and the front half shell 1008 to form a single sealed area for the air reservoir 320.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for providing a cushion at a seat of a vehicle, comprising:
    disposing a carrier plate within an open volume of a seat back;
    disposing an air bladder on the seat back;
    placing an air reservoir on the carrier plate, wherein the air reservoir is disposed on the carrier plate within the open volume of the seat back;
    operating the air reservoir to control an air pressure within the air bladder; and
    controlling a pump to control flow of ambient air into the air reservoir, wherein the pump is disposed within the open volume.

2. The method of claim 1, further comprising storing the air reservoir on the carrier plate via a bracket of the carrier plate.

3. The method of claim 1, wherein the air reservoir is an integrated component of the carrier plate.

4. The method of claim 3, further comprising welding a front plate and a rear plate to form the carrier plate.

5. The method of claim 3, further comprising welding a front plate to a center plate of the carrier plate and welding a rear plate to the center plate.

6. The method of claim 1, further comprising filling the air bladder via the air reservoir until the air pressure within the air reservoir is equal to the air pressure within the air bladder and then controlling the pump to replenish the air reservoir.

7. The method of claim 1, further comprising operating an air module to control the flow of air between the air reservoir and the air bladder.

8. A seat for a vehicle, comprising:
    a seat back forming an open volume;
    a carrier plate disposed on the seat back within the open volume;
    an air bladder;
    an air reservoir disposed on the carrier plate for inflating the air bladder, wherein the air reservoir is disposed on the carrier plate within the open volume of the seat back and is configured to control an air pressure within the air bladder; and
    a pump configured to control a flow of ambient air into the air reservoir, wherein the pump is disposed within the open volume.

9. The seat of claim 8, wherein the carrier plate includes a bracket and the air reservoir includes an air tank stored on the carrier plate via the bracket.

10. The seat of claim 8, wherein the air reservoir is an integrated component of the carrier plate.

11. The seat of claim 10, wherein the air reservoir is created by a weld between a front plate and a rear plate, wherein the front plate and the rear plate form the carrier plate.

12. The seat of claim 10, wherein the air reservoir is created by a first weld between a front plate and a center plate of the carrier plate and a second weld between a rear plate and the center plate.

13. The seat of claim 8, further comprising a primary pump disposed in the open volume and a secondary pump disposed in the open volume.

14. The seat of claim 8, further comprising an air module integrated into the carrier plate, wherein the air module is configured to control a flow of air between the air reservoir and the air bladder.

15. A vehicle, comprising:
a seat for a passenger of the vehicle, the seat comprising:
a seat back forming an open volume;
a carrier plate disposed on the seat back within the open volume;
an air bladder;
an air reservoir disposed on the carrier plate for inflating the air bladder, wherein the air reservoir is disposed on the carrier plate within the open volume of the seat back and is configured to control an air pressure within the air bladder; and
a pump configured to control a flow of ambient air into the air reservoir, wherein the pump is disposed within the open volume.

16. The vehicle of claim 15, wherein the carrier plate includes a bracket and the air reservoir includes an air tank stored on the carrier plate via the bracket.

17. The vehicle of claim 15, wherein the air reservoir is an integrated component of the carrier plate.

18. The vehicle of claim 17, wherein the air reservoir is created by a weld, wherein the weld is one of: (i) between a front plate and a rear plate, wherein the front plate and the rear plate form the carrier plate; and (ii) a first weld between the front plate and a center plate of the carrier plate and a second weld between the rear plate and the center plate.

19. The vehicle of claim 15, further comprising a primary pump disposed in the open volume and a secondary pump disposed in the open volume.

20. The vehicle of claim 15, further comprising an air module integrated into the carrier plate, wherein the air module is configured to control a flow of air between the air reservoir and the air bladder.

* * * * *